US 8,072,766 B2

(12) United States Patent
Shimura et al.

(10) Patent No.: US 8,072,766 B2
(45) Date of Patent: Dec. 6, 2011

(54) PORTABLE DEVICE FOR TRANSMITTING SIGNAL

(75) Inventors: Tokio Shimura, Anjo (JP); Mitsuru Nakagawa, Chiryu (JP)

(73) Assignee: Denso Corporation, Kariya (JP)

( * ) Notice: Subject to any disclaimer, the term of this patent is extended or adjusted under 35 U.S.C. 154(b) by 394 days.

(21) Appl. No.: 12/175,860

(22) Filed: Jul. 18, 2008

(65) Prior Publication Data
US 2009/0040737 A1 Feb. 12, 2009

(30) Foreign Application Priority Data
Aug. 7, 2007 (JP) ................................ 2007-205873

(51) Int. Cl.
*H05K 5/00* (2006.01)
(52) U.S. Cl. .............. 361/752; 361/679.08; 361/679.34; 361/760; 174/359; 307/11; 340/5.61; 340/5.62
(58) Field of Classification Search .................. 361/752, 361/679.08, 679.34, 760; 174/359; 307/11; 340/5.61, 5.62
See application file for complete search history.

(56) References Cited

U.S. PATENT DOCUMENTS

| 4,158,230 | A | * | 6/1979 | Washizuka et al. ............ 708/142 |
| 4,635,354 | A | * | 1/1987 | Chrobak et al. ................. 29/622 |
| 4,681,987 | A | * | 7/1987 | Suwa ............................ 200/5 A |
| 4,801,768 | A | * | 1/1989 | Sugiyama et al. ............. 200/5 A |
| 4,864,115 | A | * | 9/1989 | Imran et al. ................... 235/492 |
| 4,876,441 | A | * | 10/1989 | Hara et al. ..................... 235/488 |
| 5,038,251 | A | * | 8/1991 | Sugiyama et al. ........... 235/61 R |
| 5,291,193 | A | * | 3/1994 | Isobe et al. ................ 340/825.69 |
| 5,422,783 | A | * | 6/1995 | Darbee ...................... 361/679.08 |
| 5,523,745 | A | * | 6/1996 | Fortune et al. ........... 340/825.19 |
| 5,654,111 | A | * | 8/1997 | Minomiya et al. ............. 429/162 |
| 5,782,867 | A | * | 7/1998 | Shrock et al. .................. 606/234 |
| 5,805,423 | A | * | 9/1998 | Wever et al. ................... 361/760 |
| 6,137,710 | A | * | 10/2000 | Iwasaki et al. ................... 365/52 |
| 6,172,431 | B1 | * | 1/2001 | Honeyman .................... 307/10.2 |
| 6,262,886 | B1 | * | 7/2001 | DiFonzo et al. .......... 361/679.34 |

(Continued)

FOREIGN PATENT DOCUMENTS
JP 62-290024 12/1987
(Continued)

OTHER PUBLICATIONS

Japanese Office Action dated Sep. 15, 2009, issued in corresponding Japanese Application No. 2007-205873, with English translation.

*Primary Examiner* — Xiaoliang Chen
(74) *Attorney, Agent, or Firm* — Nixon & Vanderhye PC

(57) ABSTRACT

A portable device includes an operating part, a circuit board, and a case body for housing the operating part and the circuit board. The circuit board has a circuit section configured to transmit a signal to an external device. A terminal electrode and a pair of switch electrodes are disposed on the circuit board. The terminal electrode supplies electricity from a power source to the circuit section. A switch element is configured to electrically couple the pair of switch electrodes in accordance with an operation of the operating part. A resin member is disposed on the circuit board in such a manner that the circuit section is covered with the resin member and the terminal electrode and the pair of switch electrodes are exposed to an outside of the resin member.

16 Claims, 3 Drawing Sheets

U.S. PATENT DOCUMENTS

| | | | |
|---|---|---|---|
| 6,282,819 B1 * | 9/2001 | Gu | 40/124.03 |
| 6,349,824 B1 * | 2/2002 | Yamada | 206/316.1 |
| 6,377,465 B1 * | 4/2002 | Tanaka | 361/760 |
| 6,463,263 B1 * | 10/2002 | Feilner et al. | 455/90.1 |
| 6,545,233 B2 * | 4/2003 | Takezawa | 200/6 A |
| 6,546,435 B1 * | 4/2003 | Yoshimura et al. | 710/4 |
| 6,733,327 B2 | 5/2004 | Sugimoto et al. | |
| 6,849,817 B2 * | 2/2005 | Takata et al. | 200/339 |
| 7,050,292 B2 | 5/2006 | Shimura et al. | |
| 7,067,734 B2 * | 6/2006 | Abe et al. | 174/359 |
| 7,142,413 B2 * | 11/2006 | Sugimoto et al. | 361/679.57 |
| 7,201,310 B2 * | 4/2007 | Kawamata | 235/375 |
| 7,225,972 B2 * | 6/2007 | Kawamata | 235/375 |
| 7,271,423 B2 * | 9/2007 | Hanamoto et al. | 257/98 |
| 7,330,743 B2 * | 2/2008 | Hutchison et al. | 455/575.8 |
| 7,355,137 B2 * | 4/2008 | Kawasaki et al. | 200/302.2 |
| 7,445,476 B2 * | 11/2008 | Ujii et al. | 439/159 |
| 7,463,134 B1 * | 12/2008 | Stilley | 340/5.61 |
| 7,519,404 B2 * | 4/2009 | Lonka et al. | 455/575.4 |
| 7,561,684 B2 * | 7/2009 | Tsutaichi et al. | 379/433.01 |
| 7,635,821 B2 * | 12/2009 | Hamada | 200/343 |
| 2003/0010721 A1 * | 1/2003 | Aldred et al. | 210/694 |
| 2005/0052128 A1 * | 3/2005 | Nakanishi | 313/506 |
| 2005/0060064 A1 * | 3/2005 | Valen et al. | 700/264 |
| 2005/0136852 A1 * | 6/2005 | Nakagawa et al. | 455/90.3 |
| 2005/0181843 A1 * | 8/2005 | Tsujimoto | 455/575.1 |
| 2006/0066151 A1 * | 3/2006 | Hatemata | 307/11 |
| 2006/0245145 A1 | 11/2006 | Wada et al. | |
| 2007/0066394 A1 * | 3/2007 | Ikeda et al. | 463/37 |
| 2007/0200053 A1 * | 8/2007 | Nomura et al. | 250/206 |
| 2007/0223317 A1 * | 9/2007 | Sun | 368/88 |
| 2008/0084403 A1 * | 4/2008 | Kimura et al. | 345/204 |
| 2010/0048249 A1 * | 2/2010 | Furuta et al. | 455/566 |

FOREIGN PATENT DOCUMENTS

| | | |
|---|---|---|
| JP | 06-268548 | 9/1994 |
| JP | 11-280313 | 10/1999 |
| JP | 2002-343905 | 11/2002 |
| JP | 2004-153526 | 5/2004 |
| JP | 2004-172176 | 6/2004 |

* cited by examiner

PORTABLE DEVICE FOR TRANSMITTING SIGNAL

CROSS REFERENCE TO RELATED APPLICATIONS

The present application is based on and claims priority to Japanese Patent Application No. 2007-205873 filed on Aug. 7, 2007, the contents of which are incorporated in their entirety herein by reference.

BACKGROUND OF THE INVENTION

1. Field of the Invention

The present invention relates to a portable device for transmitting a signal.

2. Description of the Related Art

U.S. Pat. No. 7,050,292 (corresponding to JP-A-2004-153526) discloses a portable equipment that can be used for a keyless entry system. The portable equipment includes a circuit board, a button battery, and a case body for housing the circuit board and the button battery therein. The case body includes an upper case and a lower case. The circuit board has a circuit section that includes electronic elements. The circuit section is supplied with electricity from the button battery. At opening portions of the upper case, knob pieces are disposed so that switching elements disposed on the circuit board can be controlled by operating the knob pieces.

In the case body, a water-proof cover is disposed. The water-proof cover includes a thin-film cover and a ring-shaped part integrally formed at an outer peripheral portion of the thin-film cover. The ring-shaped part is held between the upper case and the lower case. The thin-film cover is disposed between the circuit board and the knob pieces.

In the above-described portable equipment, a pressing surface of the upper case and a pressing surface of the lower case that press the ring-shaped part of the water-proof cover are required to be formed with a high accuracy so as to provide a stable waterproof property of the circuit section. In addition, the upper case and the lower case are required to have a high rigidity to maintain the pressing surfaces formed with the high accuracy. Thus, a thickness of the upper case and a thickness of the lower case may increase, and thereby a dimension of the portable equipment may increase.

SUMMARY OF THE INVENTION

In view of the foregoing problems, it is an object of the present invention to provide a portable device including a waterproof circuit section.

According to an aspect of the invention, a portable device includes a case body, an operating part, a circuit board, a terminal electrode, a pair of switch electrodes, a switch element, and a resin member. The operating part is disposed in the case body. The circuit board is housed in the case body and has a circuit section. The circuit section includes an electronic element mounted on the circuit board and is configured to transmit a signal to an external device. The terminal electrode is disposed on the circuit board for supplying electricity from a power source to the circuit section. The pair of switch electrodes is disposed on the circuit board. The switch element is configured to electrically couple the pair of switch electrodes in accordance with an operation of the operating part. The resin member is disposed on the circuit board in such a manner that the circuit section is covered with the resin member and the terminal electrode and the pair of switch electrodes are exposed to an outside of the resin member.

The present portable device can ensure a waterproof property of the circuit section of the printed circuit board.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

A portable device 1 according to an exemplary embodiment of the invention can be suitably used as a portable electronic key, i.e., a smart key. For example, identification data of the portable device 1 is verified with identification data of a vehicle by a two-way communication, and then each door of the vehicle can be locked and unlocked by using the portable device 1. In addition, when a passenger having the portable device 1 is in a vehicle compartment, a steering lock mechanism can be unlocked and an engine can be started by using the portable device 1.

Figure 1:
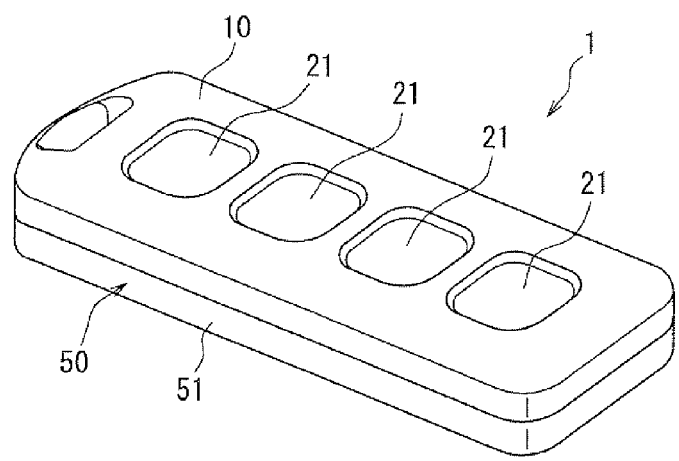
FIG. 1 is a perspective view illustrating a portable device according to an exemplary embodiment of the invention.

As illustrated in FIG. 1, the portable device 1 includes a case body including a front case 10 and a rear case 50. The front case 10 has a plurality of opening portions. A plurality of knob pieces 21 is disposed at the plurality of opening portions respectively.

The front case 10 may be made of resin such as polycarbonate resin, acrylonitrile-butadiene-styrene resin (ABS resin), and polyamide resin, The rear case 50 may be made of resin similar to the resin of the front case 10. On an outer surface of the rear case 50, elastomer layer 51 is integrally formed with the rear case 50. The elastomer layer 51 is an elastic sheet made of thermoplastic elastomer resin. The case body has a through hole as a key ring hole, for example.

In the portable device 1 illustrated in FIG. 1, four knob pieces 21 are disposed. Each knob piece 21 is provided for controlling one of a door lock/unlock function, a trunk open function, a power slide door open/close function, a power back door open/close function, and a panic response function, for example. The panic response function is a function for activating an emergency response operation of the vehicle when the vehicle is involved in a criminal act or when the vehicle has a possibility of being involved in a criminal act. Each knob piece 21 an example of an operating part.

Figure 2:
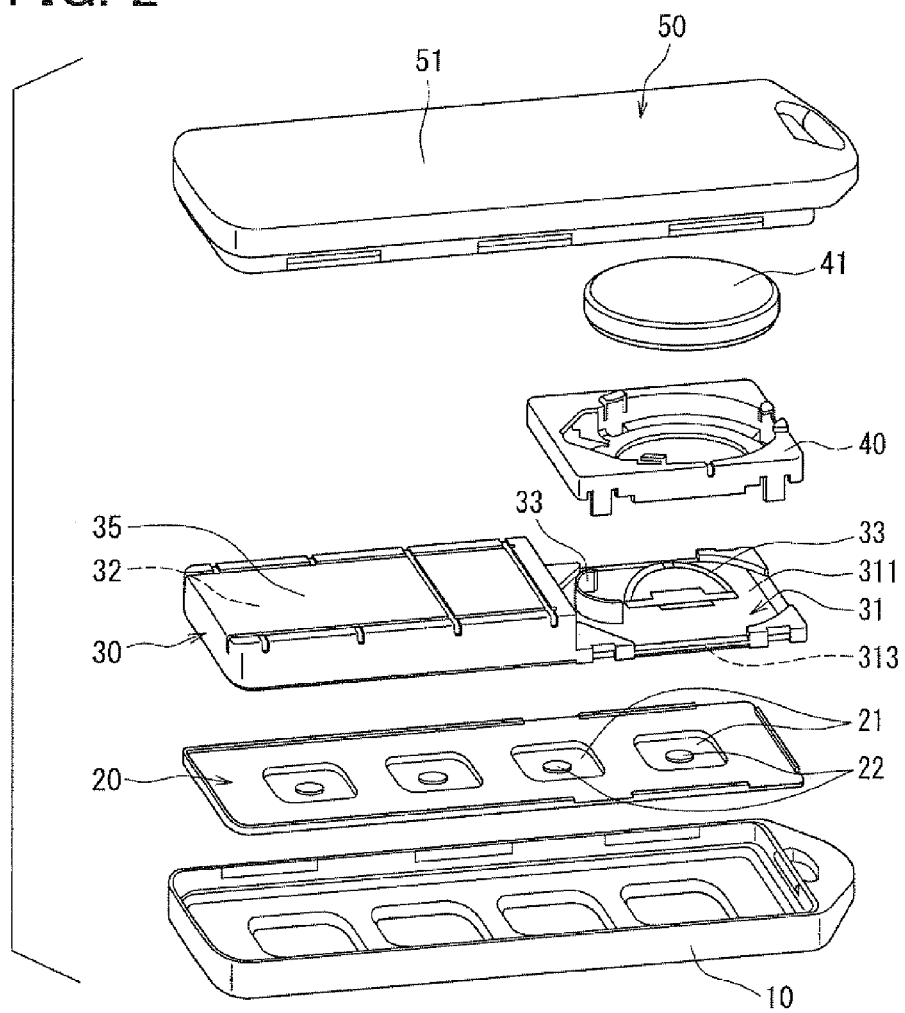
FIG. 2 is an exploded perspective view illustrating the portable device.

As illustrated in FIG. 2, between the front case 10 and the rear case 50, a knob sheet 20, a circuit unit 30, and battery holder 40 is arranged in this order from the front case side to the rear case side. Each of the knob sheet 20 and the circuit unit 30 has an approximately rectangular shape corresponding to a shape in the front case 10 and the rear case 50. The battery holder 40 is configured to house a button battery 41 therein.

The knob sheet 20 is made of silicon rubber for example. The knob pieces 21 are formed in the knob sheet 20 to be coupled to each other. On a rear case side of each knob piece 21, a conductive contact 22 is integrally formed. The conductive contacts 22 consist mainly of carbon, for example.

The circuit unit 30 includes a printed circuit board 31. The printed circuit board 31 has a first surface 311 arranged on the rear case side, a second surface 312 arranged on the front case side, and a side surface 313 extending from a peripheral edge of first surface 311 to a peripheral edge of the second surface 312. On the first surface side of the printed circuit board 31, a circuit section 32 is provided. In the circuit section 32, electronic elements (not shown) including an antenna element are mounted on the first surface 311. The circuit section 32 is configured to transmit a signal to an external device disposed in the vehicle.

On the first surface 311 of the printed circuit board 31, a pair of terminals 33 is also disposed. The pair of terminals 33 is an example of a terminal electrode for supplying electricity from the button battery 41 to the circuit section 32.

Figure 3:
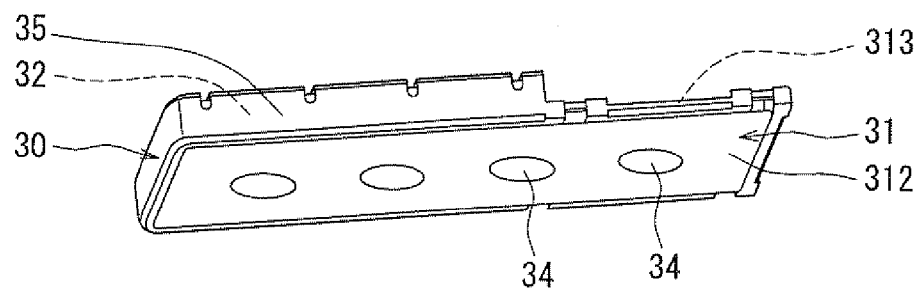
FIG. 3 is a perspective view illustrating a circuit unit viewed from a knob sheet side.

As illustrated in FIG. 3, on the second surface 312 of the printed circuit board 31, four pairs of opposite electrodes 34 are disposed to face the four conductive contacts 22 of the knob sheet 20, respectively. When one conductive contact 22 comes in contact with the corresponding pair of opposite electrodes 34, electric current flows between the pair of opposite electrodes 34. When the one conductive contact 22 separates from the pair of opposite electrodes 34, electric current does not flow between the pair of opposite electrodes 34. Thus, an electric switching is controlled when the conductive contact 22 comes in contact with and separates from the pair of the opposite electrodes 34.

Figure 4:
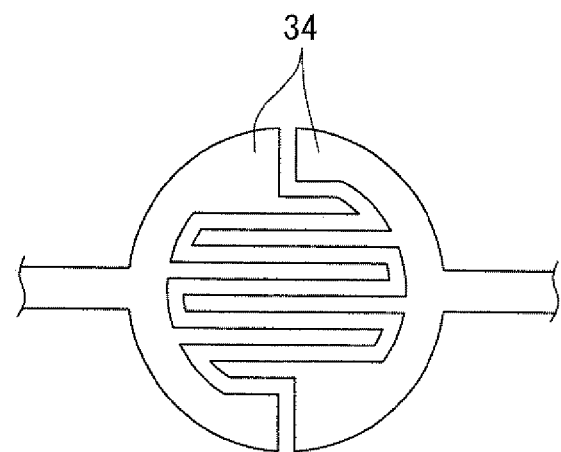
FIG. 4 is a plan view illustrating a pair of opposite electrodes.

As illustrated in FIG. 4, each opposite electrode 34 has a pectinate shape. That is, each opposite electrode 34 has a plurality of protruding portions. In each pair of opposite electrodes 34, one opposite electrode 34 is separated from the other opposite electrode 34 and the protruding portions of the one opposite electrode 34 are alternately arranged with the protruding portions of the other opposite electrode 34. Each conductive contact 22 is an example of a switch element and each pair of opposite electrodes 34 is an example of a pair of switch electrodes.

Each of the terminals 33 and the opposite electrodes 34 has a surface plated with gold. Thereby, electric resistances of the surfaces can be reduced and the surfaces can be restricted from rusting. Thus, the pair of terminals 33 and the four pair of the opposite electrodes 34 can keep low electric resistances of the surfaces thereof.

The circuit unit 30 is molded with a resin member 35 in such a manner that the whole circuit section 32 is covered with the resin member 35, and the pair of terminals 33 and the four pair of opposite electrodes 34 are exposed to an outside of the resin member 35. The resin member 35 is made of epoxy resin, for example.

Figure 5A:
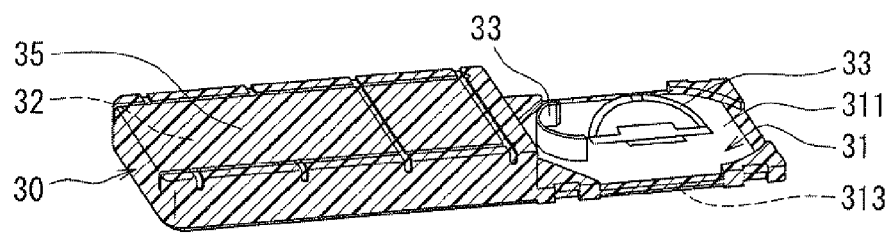
FIG. 5A and FIG. 5B are perspective views illustrating a resin member in the circuit unit.
Figure 5B:
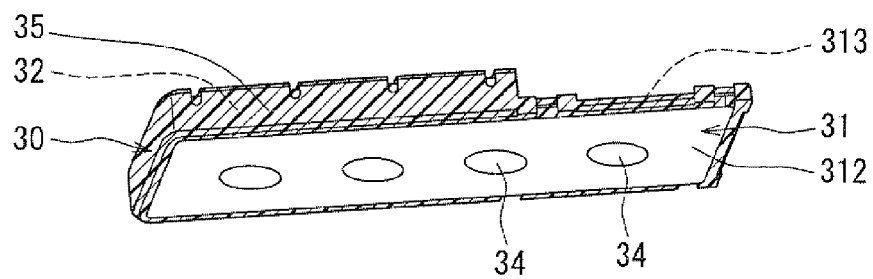

For example, as illustrated by the shaded area in FIG. 5A and FIG. 5B, the resin member 35 covers an area of the first surface 311 other than an area having a shape corresponding to a shape of the button battery 41 and including the pair of terminals 33. In addition, the resin member 35 covers the whole side surface 313 of the printed circuit board 31.

The whole second surface 312 of the printed circuit board 31 is not covered with the resin member 35. Thus, when the circuit section 32 including the electronic elements is molded with resin, the second surface 312, on which the electronic elements are not mounted, can closely come in contact with an inner surface of a cavity of a molding tool. Thereby, even if resin is filled into the cavity with a high pressure, the printed circuit board 31 is difficult to be warped and the resin member 35 can be firmly attached to the circuit section 32.

In the circuit unit 30, the pair of terminals 33 and the four pairs of the opposite electrodes 34 are exposed to the outside of the resin member 35 and the circuit section 32 including the electronic elements is covered with the resin member 35. Thus, the circuit section 32 can have a waterproof property without a waterproof cover including a ring-shaped part. As a result, a dimension of the case body of the portable device 1 can be reduced.

The resin member 35 covers the side surface 313 in addition to the area of the first surface 311 where the circuit section 32 is provided. Thus, an adhesion of the resin member 35 with the printed circuit board 31 can be improved.

As described above, each opposite electrode 34 has a plurality of protruding portions. In each pair of opposite electrodes 34, one opposite electrode 34 is separated from the other opposite electrode 34 and the protruding portions of the one opposite electrode 34 are alternately arranged with the protruding portions of the other opposite electrode 34. In accordance with an operation of one of the knob pieces 21, the corresponding conductive contact 22 comes in contact with and separates from the corresponding pair of opposite electrodes 34. Thereby the electric switching can be controlled with a high degree of certainty.

The conductive contacts 22 are integrally formed with the surfaces of the knob pieces 21 on the printed circuit board side. Thus, when one of the knob pieces 21 is operated, the corresponding conductive contact 22 comes in contact with and separates from the corresponding pair of opposite electrodes 34 with a high degree of certainty.

The knob sheet 20 has a planar shape similar to a planar shape of the circuit unit 30 and is disposed in the front case 10 along an inner surface of the front case 10. The elastomer layer 51 is integrally formed with the rear case 50 so as to cover the whole outer surface of the rear case 50. The circuit unit 30 can be protected from a vibration and a drop impact by the knob sheet 20 and the elastomer layer 51 made of elastic sheets.

Because the knob sheet 20 is held between the front case 10 and the circuit unit 30, the knob sheet 20 is difficult to get out of position. In addition, because the elastomer layer 51 is integrally formed with the rear case 50, the elastomer layer 51 does not get out position with respect to the rear case 50.

Although the present invention has been fully described in connection with the exemplary embodiments thereof with reference to the accompanying drawings, it is to be noted that various changes and modifications will become apparent to those skilled in the art.

In the above-described exemplary embodiment, resin is filled into the cavity of the molding tool and is solidified under pressure so that the resin member 35 covers the circuit section 32. Alternatively, the resin member 35 may be formed by potting. In the present case, a frame body is disposed to surround the circuit section 32, and then resin is filled into the frame body and is solidified without applying pressure.

The resin member 35 may be made of polyurethane resin, for example, without being limited to epoxy resin.

The conductive contacts 22 may be made of various conductive materials without being limited to carbon. For example, the conductive contacts 22 may be made of metal.

In the above-described exemplary embodiment, each opposite electrode 34 has the pectinate shapes, as an example. Alternatively, each opposite electrode 34 may have other shape. Also in the present case, in each pair of opposite electrodes 34, one opposite electrode 34 is arranged to oppose the other opposite electrode 34.

In the above-described exemplary embodiment, the circuit unit 30 is protected by elastic sheets including the knob sheet 20 disposed along the inner surface of the front case 10 and the elastomer layer 51 integrally formed at an outer surface of the rear case 50. Alternatively, the elastic sheet may be disposed one of an inner surface and an outer surface of the case body. For example, the elastic sheet may be disposed along the inner surface of the case body on both sides of the circuit unit 30.

The portable device 1 is not limited to the portable electronic key (i.e., smart key) as illustrated in FIG. 1. Alternatively, the portable device 1 may be other device that can transmit a signal to an external device. For example, the portable device 1 may be a keyless transmitter for a keyless entry system.

Such changes and modifications are to be understood as being within the scope of the present invention as defined by the appended claims.

What is claimed is:

1. A portable device comprising:
a case body;
an operating part disposed in the case body;
a circuit board housed in the case body and having a circuit section, the circuit section including an electronic element mounted on the circuit board, and the circuit section configured to transmit a signal to an external device;
a battery holder disposed on the circuit board and configured to house a button battery;
a terminal electrode disposed on the circuit board for supplying electricity from the button battery to the circuit section;
a pair of switch electrodes disposed on the circuit board;
a switch element configured to electrically couple the pair of switch electrodes in accordance with an operation of the operating part; and
a resin member disposed on the circuit board in such a manner that the circuit section is covered with the resin member, whereas the battery holder, the terminal electrode and the pair of switch electrodes are not covered with the resin member and are exposed to an outside of the resin member, wherein
the battery holder is a distinct and separate component from the resin member.

2. The portable device according to claim 1, wherein:
the circuit board has a first surface and a second surface opposing the first surface;
the electronic element is mounted on the first surface;
the first surface is covered with the resin member; and
the second surface is exposed to the outside of the resin member.

3. The portable device according to claim 2, wherein:
the circuit board further has a side surface extending from a peripheral edge of the first surface to a peripheral edge of the second surface; and
the resin member covers the first surface and the side surface.

4. The portable device according to claim 1, wherein each of the terminal electrode and the pair of switch electrodes has a surface plated with gold.

5. The portable device according to claim 1, wherein:
one of the switch electrodes is separated from the other switch electrode;
the switch element is made of conductive material; and
the switch element is capable of coming in contact with and separating from the pair of switch electrodes.

6. The portable device according to claim 5, wherein:
each of the switch electrodes has a plurality of protruding portions; and
the plurality of protruding portions of the one switch electrode is alternately arranged with the plurality of protruding portions of the other switch electrode.

7. The portable device according to claim 5, wherein:
the operating part is made of a flexible sheet; and
the switch element is integrally disposed on a surface of the flexible sheet opposed to the circuit board.

8. The portable device according to claim 1, further comprising
an elastic sheet disposed on one of an inner surface and an outer surface of the case body.

9. The portable device according to claim 8, wherein the elastic sheet is integrally formed with the case body.

10. The portable device according to claim 1, wherein the external device is disposed in a vehicle.

11. The portable device according to claim 1, wherein there are a plurality of operating parts, and
the case body includes a front case and a rear case, the front case having a plurality of opening portions, each corresponding to a respective said operating part.

12. The portable device according to claim 11, wherein said operating parts are carried by a support member sheet disposed within said case body, adjacent the front case.

13. The portable device according to claim 1, wherein the support member sheet is held between the front case and the circuit unit.

14. The portable device according to claim 1, wherein an elastomer layer is integrally formed with the rear case so as to cover an entire outer surface of the rear case.

15. The portable device according to claim 1, wherein the battery holder is disposed adjacent one longitudinal end of the circuit board and said circuit section is longitudinally spaced from the battery holder, so that the circuit section is disposed next to a portion of the circuit board on which the battery holder is disposed.

16. The portable device according to claim 1, wherein the resin member covers an area of a first surface of the circuit board other than an area having a shape corresponding to a shape of the button battery and the resin member covers an entire side surface of the printed circuit board, whereas an entire second surface of the printed circuit board, opposite said first surface, is not covered with the resin member.

* * * * *